US005214792A

United States Patent [19]

Alwadish

[11] Patent Number: 5,214,792

[45] Date of Patent: * May 25, 1993

[54] BROADCASTING SYSTEM WITH SUPPLEMENTAL DATA TRANSMISSION AND STORGE

[76] Inventor: David J. Alwadish, 55 W. 74th St., New York, N.Y. 10023

[ * ] Notice: The portion of the term of this patent subsequent to Nov. 5, 2008 has been disclaimed.

[21] Appl. No.: 788,028

[22] Filed: Nov. 5, 1991

Related U.S. Application Data

[63] Continuation-in-part of Ser. No. 663,298, Feb. 28, 1991, Pat. No. 5,063,610, which is a continuation of Ser. No. 413,536, Sep. 27, 1989, abandoned.

[51] Int. Cl.[5] ........................ H04B 1/00; H04B 17/02

[52] U.S. Cl. .................................. 455/45; 455/154.1; 455/186.1

[58] Field of Search ..................... 455/3, 6, 42, 45, 66, 455/68, 70, 158, 195, 186; 381/1, 2, 3, 4, 5, 6, 77, 78, 81, 119

[56] References Cited

U.S. PATENT DOCUMENTS

| | | | |
|---|---|---|---|
| 4,268,724 | 5/1981 | Hubbard | 360/7 |
| 4,279,035 | 7/1981 | Skerlos | 455/158 |
| 4,379,947 | 4/1983 | Warner | 370/11 |
| 4,380,027 | 4/1983 | Levente et al. | 358/142 |
| 4,392,246 | 7/1983 | Niioka et al. | 455/158 |
| 4,488,273 | 12/1984 | Nokihara et al. | 369/11 |
| 4,534,654 | 8/1985 | Marsel | 381/14 |
| 4,686,528 | 8/1987 | Ferrer et al. | 340/825.44 |
| 4,686,707 | 8/1987 | Iwasaki et al. | 455/70 |
| 4,787,085 | 11/1988 | Suto et al. | 455/6 |
| 4,805,217 | 2/1989 | Morihiro et al. | 381/35 |
| 4,829,500 | 5/1989 | Saunders | 381/77 |
| 4,829,558 | 5/1989 | Welsh | 455/2 |
| 4,879,751 | 11/1989 | Franks et al. | 381/81 |
| 4,887,308 | 12/1989 | Dutton | 455/158 |
| 4,908,713 | 3/1990 | Levine | 455/181 |
| 5,063,610 | 11/1991 | Alwadish | 455/158 |

FOREIGN PATENT DOCUMENTS

| | | | |
|---|---|---|---|
| 58-131865 | 8/1983 | Japan | 455/181 |
| 60-170332 | 9/1986 | Japan . | |

OTHER PUBLICATIONS

E.B.U. Specifications of the radic data system RDS for VHF/FM sound bioadcasting, Mar. 1984.

G. L. Dexter, a new age for radio, Popular Electronics, Oct. 1989.

*Primary Examiner*—Reinhard J. Eisenzopf
*Assistant Examiner*—Lisa Charouel
*Attorney, Agent, or Firm*—Leo Zucker

[57] ABSTRACT

A broadcast receiver or monitor unit receives and decodes items of information pertaining to broadcast program material, such as the title of a broadcast musical piece, the artist name, tape/CD catalog number, and the like. The information items can be displayed on a panel simultaneously with the broadcast. Upon entry of a memory command, the receiver stores the decoded items of information data in a memory. Sets of stored information data relating to selected broadcasts can later be retrieved from the memory and recorded in a predetermined format on paper strips or coupons by a printer device.

20 Claims, 3 Drawing Sheets

BROADCASTING SYSTEM WITH SUPPLEMENTAL DATA TRANSMISSION AND STORGE

CROSS REFERENCE TO RELATED APPLICATIONS

This application is a continuation in part of my copending application Ser. No. 07/663,298, filed Feb. 28, 1991, and due to issue as U.S. Pat. No. 5,063,610 on Nov. 5, 1991. My '298 application is a continuation of application Ser. No. 07/413,536 filed Sep. 27, 1989, and now abandoned.

BACKGROUND OF THE INVENTION

I. Field of the Invention.

The present invention relates generally to broadcasting systems, and more particularly to broadcast receiving apparatus in which supplemental data inserted in a broadcast carrier to which the apparatus is tuned, is decoded and presented to the listener via a visual display and/or a printer unit.

II. Discussion of the Known Art.

Listeners of all kinds of music frequently wish they can remember the name, artist or other pertinent information relating to a musical piece or selection they heard during a recent broadcast. If the listener happens to hear an announcer identify the piece before or after it is played over the broadcast station, he or she may note the information down with pencil and paper if convenient. Usually, however, the selection is first heard by the listener while driving or under some other condition where it is not possible or practical to jot down identifying information so as to enable the selection to be later purchased at a retail store.

Broadcast stations often transmit a number of musical pieces one right after the other, by various artists and without any narration or other means of identifying the title or performer of each piece just before or after it is played. Thus, when an announcer finally identifies each of, e.g., five selections that were played successively over the past 15 minutes, the listener cannot be sure which title and name identifies a particular selection he or she may have especially liked.

My U.S. Pat. No. 5,063,610 issued on Nov. 5, 1991, discloses a broadcasting system and receiver that afford the listener an opportunity to identify, by means of supplemental information encoded in the broadcast carrier signal, items such as the artist and title of a musical selection. The supplemental information can be displayed simultaneously with the broadcast by way of a display panel on the receiver, and the information can also be stored in a receiver memory to be displayed or printed out at a later time for the listener's convenience.

U.S. Pat. No. 4,887,308 (Dec. 12, 1989) relates to a broadcast data storage and retrieval system including a memory for storing information encoded with a broadcast, and a display for presentation of the stored information at a later time. A frequency-modulation (FM) broadcasting system has also been proposed in which auxiliary tuning and program information is inserted into a monophonic or stereophonic FM broadcast in the commercial FM band of 88 to 108 MHz. See Specifications of the Radio Data System RDS for VHF/FM Sound Broadcasting, European Broadcasting Union, Tech. 3244-E (March 1984), referred to hereafter as "the EBU system".

In the EBU system, blocks of character data are continuously inserted, in synchronized fashion, in a 57 KHz subcarrier of a FM broadcast signal. The blocks of data may correspond to (1) the country from which the broadcast originates, (2) the area of coverage, viz., international, national or regional, and (3) the type of program such as traffic information, sports, pop music or the like. Circuitry within specially designed automobile receivers would, upon decoding the data blocks, cause the receiver either to stay tuned to the received station, or to scan for another station that is transmitting a certain kind of program information pre-selected by the driver. The EBU system does contemplate transmissions of text material (Radiotext) addressed primarily to new home receivers. It is acknowledged that a changing message display on an automobile receiver could divert the driver's attention from the road and thus present a safety hazard.

U.S. Pat. No. 4,805,217 issued Feb. 14, 1989. discloses set with a playback function. A portion of an audio signal that is reproduced by a receiver can be stored in a digital memory, for later recall by the listener. Likewise, U.S. Pat. No. 4,268,724 issued May 19, 1981, and U.S. Pat. No. 4,488,273 issued Dec. 11, 1984, disclose systems in which a received radio broadcast program is first recorded on a continuous loop of magnetic tape prior to being audibly reproduced.

SUMMARY OF THE INVENTION

An object of the invention is to provide a broadcast receiving unit that allows listeners safely to view and record selected auxiliary information transmitted during a broadcast.

Another object of the invention is to provide a broadcast receiver or monitor system wherein supplemental information pertaining to broadcast program material and encoded for transmission with the program material is decoded, and can be immediately displayed, stored and later viewed and/or printed out at the listener's convenience.

A further object of the invention is to provide a broadcast receiver or monitor system in which items of identifying information encoded for transmission with program material from a broadcasting station, are decoded and stored in a detachable memory card which, when removed from the receiver, can be coupled to a printer unit to obtain a hard copy or "coupon" that displays the stored information.

Another object of the invention is to provide a broadcast receiver or monitor system that enables listeners to view simultaneously instructional text or song lyrics while music or a song is being broadcast.

According to the invention, receiving apparatus for enabling a listener to obtain certain information associated with program material transmitted over a broadcast carrier signal to which the apparatus is tuned, includes tuner/demodulator means for detecting a broadcast carrier when the tuner/demodulator means is tuned to receive the carrier, and decoding means associated with the tuner/demodulator means for decoding information item data associated with the broadcast carrier, the information item data being related to the program material that is transmitted over the carrier. Print memory means is provided to store desired decoded information item data related to the program material, and address control means is coupled to the print memory means for controlling read and write operations for addresses of the print memory means. Memory button means and recall button means are coupled to the address control means for producing a memory command signal and a recall command signal to which the address control means responds. Print buffer/control means enables printing on a printer unit of decoded information item data that is stored in the memory means.

The various features of novelty that characterize the invention are pointed out with particularity in the claims annexed to and forming a part of the present disclosure. For a better understanding of the invention, its operating advantages and specific objects attained by its use, reference should be had to the accompanying drawing and descriptive matter in which there are illustrated and described preferred embodiments of the invention.

DETAILED DESCRIPTION OF THE INVENTION

Figure 1:
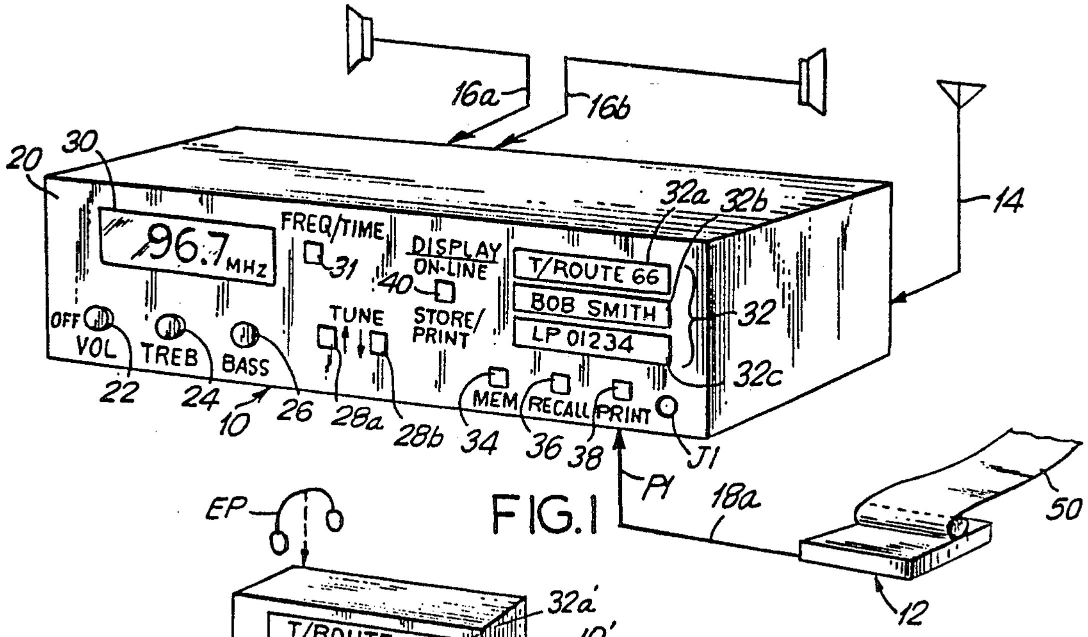
FIG. 1 is a perspective view of the overall appearance of a receiver and printer arrangement according to the present invention.

FIG. 1 is a perspective view of a receiver 10 and an associated printer device 12 arranged according to the invention. Receiver 10 may, for example, be dimensioned to fit in the dashboard of an automobile, and includes connectors on its back panel (not shown) for mating with an antenna cable 14 and a pair of speaker cables 16*a*, 16*b*. A connector J1 for a printer cable 18*a* is also provided at a convenient location on the face of the receiver 10. If the receiver 10 is removable, it may desirable to locate the printer cable connector J1 on the rear apron of the receiver chassis, together with the connectors for the antenna cable 14 and speaker cables 16*a*, 16*b*.

Receiver 10 has a front panel 20 on which an on/off volume control 22, treble control 24, and bass control 26 are arranged. In the illustrated embodiment, the receiver 10 is an FM broadcast receiver, and broadcast stations are tuned in by scanning either upwardly or downwardly in frequency by way of corresponding scan buttons 28*a*, 28*b*. Either the tuned-in station frequency, or the current time, is displayed via a liquid crystal (LC) display panel 30. Selection of the display of either the tuned-in station frequency or the current time, is made via FREQ/TIME button 31.

Another LC display panel 32 is provided on the receiver front panel 20, and allows for display of information decoded from the station carrier signal. As shown in FIG. 1, display panel 32 presents up to 3 lines of alpha-numeric text. Each line may allow for display of up to, for example, 16 characters. The top or first line 32*a* of the display panel 32 displays a title, "Route 66", that identifies a broadcast musical piece. The center or second line 32*b* of the panel 32 displays the artist's name, and the bottom or third line 32*c* of the LC display panel 32 is adapted to display a corresponding record, tape or compact disk (CD) catalogue number to facilitate the purchase of the musical piece by a listener.

A memory button 34 is arranged in the vicinity of the LC display panel 32. When memory button 34 is operated or depressed, various information items displayed by the lines 32*a*, 32*b* and 32*c* are stored in a receiver memory, as explained in detail below with respect to FIG. 6. A recall button 36, also near the display panel 32, operates to enable the recall of previously stored information items for display and/or printing. A print button 38 operates to cause the printing of the recalled information items via the printer device 12 as shown, for example, in FIGS. 3 and 4.

Also, a display select button 40 arranged next to the panel 32 operates to select either an "on-line" display of decoded information items, or a display of successive sets of stored information items when the items are recalled from memory by operating the button 36.

Figure 2:
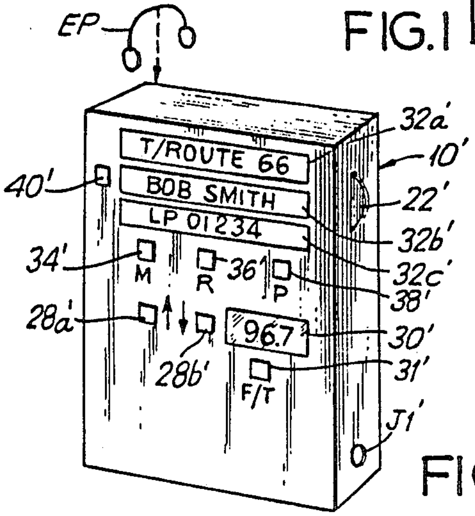
FIG. 2 is a perspective view of the overall appearance of a second embodiment of the receiver in FIG. 1.

FIG. 2 is a view of a second embodiment of the receiver 10 in FIG. 1. Corresponding components have similar reference characters. Instead of being in the form of an automobile radio, receiver 10' is adapted to be a portable unit and is powered, for example, either by a conventional self-contained battery or via an AC wall adapter (neither of which appears in the drawing). A receiver according to the present invention can also be in the form of a home table top or a cabinet mounted unit, and respond to broadcasts in the commercial AM and short-wave bands as well.

The receiver 10' of FIG. 2 may be of the kind having its sound output coupled to earphones EP adapted to be worn by a person while relaxing, walking, jogging or the like.

Receiver 10' can also act as a "monitor" to be used in conjunction with existing home or automobile radios which lack the information data decoding and storage stages described below in connection with FIG. 6. That is, in order for a listener to realize the full benefit of the present broadcasting system, he or she need only keep the monitor receiver 10' of FIG. 2 on hand. When hearing a musical piece or advertisement of interest broadcast over the existing radio, the receiver 10' is then turned on and tuned to the broadcasting station frequency. The listener then can view and store any encoded information data transmitted at the time in his or her own monitor receiver, and recall the data later on as desired. If used in such a fashion, the receiver or monitor 10' need not include circuitry for demodulating and reproducing the broadcast program material through a loudspeaker or earphones.

Figure 3:
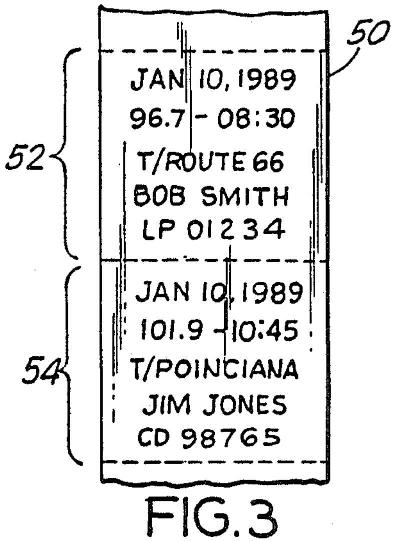
FIG. 3 is a view of two frames of printed identification text as may be obtained with the printer in FIG. 1.

FIG. 3 is a view of a portion of a paper strip 50 on which characters have been printed by the printer device 12. In addition to the three lines of identification information displayed by the LC display panel 32, a date, a station frequency and a time of day appear at the uppermost two lines of successive frames 52, 54 printed on the portion of the paper strip 50 shown in FIG. 3.

Specifically, print frame 52 indicates that on Jan. 10, 1989, while tuned to an FM station broadcasting with a carrier frequency of 96.7 MHz, the listener activated memory button 34 on the receiver 10 while listening to a musical piece entitled "Route 66" performed by "Bob Smith" and having a record catalogue number "LP 01234". Further, as shown at the end of the second line from the top of frame 52, memory button 34 was operated at 8:30 AM, the time of day during which the musical piece was actually being broadcast.

Frame 54 on the paper strip 50 indicates that on the same day, Jan. 10, 1989, but at 10:45 AM, the listener activated the memory button 34 while tuned to an FM station transmitting at a carrier frequency of 101.9 MHz and broadcasting a piece entitled "Poinciana" as performed by "Jim Jones", and having a compact disc (CD) catalogue number "CD 98765".

The two print frames 52, 54 which appear successively on the portion of the paper strip 50 shown in FIG. 3, are obtained as follows. Display button 40 is operated to set the receiver 10 in a store/print mode. Recall button 36 is then operated and, for example, the most recent set of identification data that was stored by operation of the memory button 34 is displayed on the LC display panel 32. Next, printer device 12 is connected to the receiver 10, and print button 38 is operated. Sets of stored identification data are then printed successively in the form of the frames 52, 54, and so on, on the paper strip 50 by the printer device 12. As mentioned, date, time and station frequency information are included in the frames 52, 54, so that the listener can correctly associate the printed data with the piece that was being broadcast when the memory button 34 was operated.

As shown in FIGS. 1 and 3, at the beginning of the line identifying the title of a musical piece, a prefix symbol or flag "T/" appears. The symbol, which stands for "Title", identifies the information on the line and the following lines as information pertaining to the title of a piece which was broadcast when the memory button 34 was activated.

The present invention contemplates that in addition to providing information regarding the identification of a broadcast musical piece, a broadcasting station can transmit character text for purposes of advertising.

Figure 4:
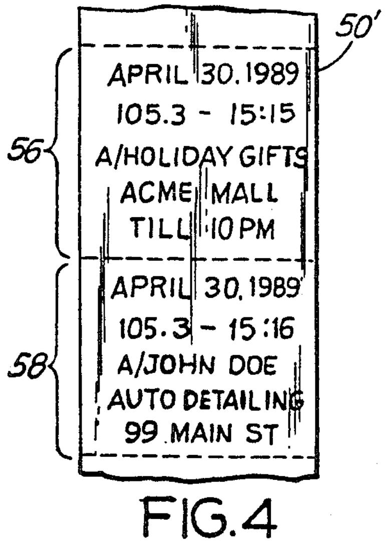
FIG. 4 is a view of two frames of advertising text as may be obtained from the printer in FIG. 1.

FIG. 4 shows a portion of a paper strip 50' on which advertising text is printed by the printer device 12 when the receiver 10 has been set in the print mode by operation of the recall button 36 and the print button 38.

During those periods when no pre-recorded program material is broadcast by a station and the station announcer is reading an advertisement, related advertising text may be encoded in the broadcast carrier signal and transmitted to the receiver 10. With the display button 40 set in the on-line mode, three lines of the advertising text are displayed simultaneously with reception of the broadcast signal by the LC display panel 32. The advertising text, as shown by the last three lines in the print frames 56, 58 in FIG. 4, provides essential information in regard to a typical advertisement, such as the advertiser name, business and location. At the beginning of the first line of the advertising text, a prefix symbol or flag "A/" is provided to designate the information on the line and the following lines of each frame as advertising material.

If the listener hears an advertisement of interest announced over a broadcast station, and would like to record essential information relating to the advertisement, he or she need only depress the memory button 34 while the receiver 10 is in the on-line mode. When the receiver 10 is later set in the print mode by operating recall and print buttons 36, 38 and the printer device 12 is connected, sets of advertising text stored by the receiver are printed on the paper strip 50, together with the date, time and frequency of the originating broadcast station.

The above so-called advertising text may also include various sorts of messages originating directly from the announcer during intervals between music broadcasts, e.g., "Radio Ronald says don't forget Valentine's Day".

Figure 5:
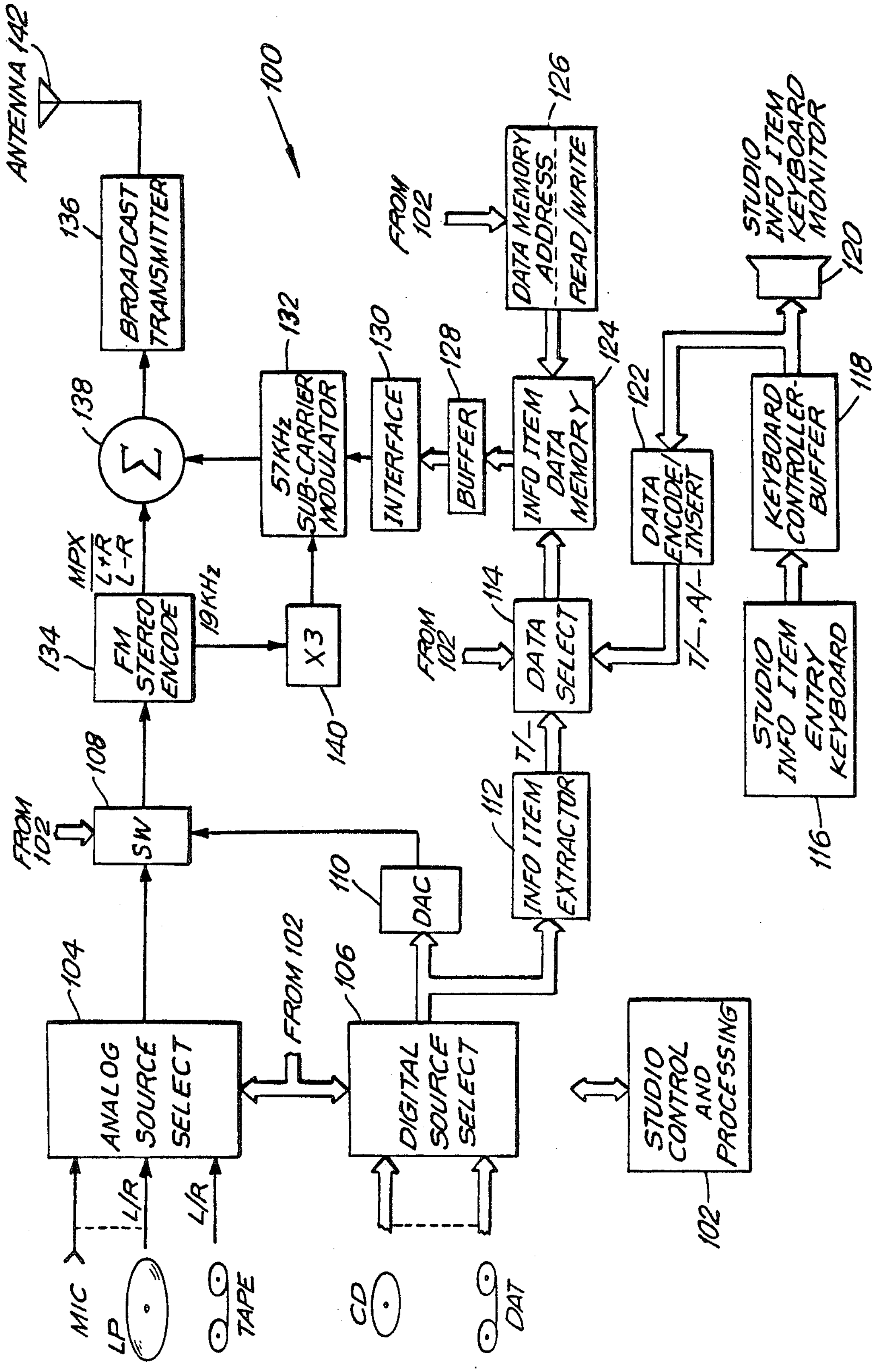
FIG. 5 is a schematic block diagram of the configuration of a broadcasting station according to the invention.

FIG. 5 is a schematic block diagram of an FM radio broadcast station 100 equipped to transmit encoded information text together with the broadcast carrier signal, according the invention.

A studio control and processing unit 102 is provided to control operations of various components comprising the broadcast station 100. The control and processing unit 102 includes one or more central processing units (CPUs), program and working memories and input-/output devices, as are ordinarily required in accordance with standard engineering practice.

Since program source material may be the form of analog media such as long playing records (LPs) or tapes; or digital media such as CDs or digital audio tapes (DATs), an analog source select switching unit 104 and a separate digital source select switching unit 106 are provided. Depending on the particular program source material, one of the source select switching units 104, 106 is enabled via control and processing unit 102. During periods when the studio microphone is "live", an announcer or other person's voice is picked-up by a microphone (MIC) coupled to the analog source select switching unit 104, the output of which is coupled to one input of analog switch 108. Digital source select switching unit 106 has an output bus coupled to an input of a digital-to-analog converter circuit (DAC) 110 the analog output of which is coupled to another input of the analog switch 108. At least part of the output bus from the digital source select unit 106 is coupled to an input of an information item extractor circuit 112 the purpose of which is as follows.

The auxiliary or identifying information text to be encoded for transmission with a broadcast carrier signal by the station 100, preferably has a digital format. It is therefore contemplated that various sources of musical program material such as CDs and DATs will provide, in addition to pre-recorded musical program material, identification information or data in digital form which data corresponds to that described in connection with FIGS. 1 and 3 for purposes of identifying the title, artist and catalogue number pertaining to the prerecorded material. Such identification text, hereafter referred to as "information items" is capable of being detected separately during play of the encoded digital source material by the information item extractor circuit 112 which provides the extracted data to one input of a data select switch 114. The "T/" prefix which appears in the display and print formats shown and described in connection with FIGS. 1 and 3, may be encoded in the digital program source material together with the information item data, or can be appended to that data when output from the extractor circuit 112.

Since the currently available program source material, whether analog or digital, will not have encoded information item data, data corresponding to that represented in FIGS. 1-4 is inserted at the broadcast station 100 via a studio information item entry keyboard 116. The keyboard 116 is controlled and its output is buffered by keyboard controller-buffer circuitry 118. Keyboard entries made by the studio announcer or other personnel are monitored via an information item keyboard monitor 120. Information item data entered by the keyboard 116 is supplied through the buffer circuitry 118 to a data encode/insert stage 122. Accordingly, character data entered via the keyboard is, prior to insertion in a broadcast carrier signal produced by the station 100, encoded to conform with a determined standard format adopted for the information items as transmitted with the carrier signal. An output of the data encode/insert stage 122 is coupled to another input of the data select switch 114.

Information item data to be transmitted, whether originating from a digital program material source or by manual entry from the keyboard 116, is output from the data select switch 114 through a suitable interface (not shown) into an information item data memory 124. Addressing of the data memory 124, and read or write control of the memory 124 is performed by a data memory controller 126 which in turn is subject to the control of studio control and processing unit 102. The output of the data memory 124 is supplied through a buffer stage 128 to digital-to-analog convertor or interface 130 an output of which is supplied through appropriate buffer circuitry (not shown) to a sub-carrier modulator 132.

The sub-carrier modulator 132 may, for example, amplitude-modulate a 57 KHz sub-carrier transmitted by the station 100 with the broadcast carrier signal while stereophonic program material is frequency-modulated on the carrier in accordance with established broadcast standards. In the United States, FM broadcast radio standards are prescribed by the Federal Communications Commission (FCC) at 47 C.F.R. §§73.201 to 73.333. All pertinent portions of the FCC broadcast standards are incorporated by reference herein.

Specifically, 47 C.F.R. §73.319 permits the use during either monophonic or stereophonic program broadcasting, of a sub-carrier that may be modulated in any form to transmit information supplemental to the regular broadcast signals. For stereophonic sound program transmissions which require insertion of a stereophonic sub-carrier at 38 KHz, the frequency of the multiplex sub-carrier must lie within the range of 53 KHz to 99 KHz. 47 C.F.R. §§73.319 & 73.323. In the illustrated embodiment of the broadcast station 100 in FIG. 5, a 57 KHz multiplex sub-carrier is employed, this frequency being the third harmonic of a 19 KHz pilot sub-carrier which is required to be inserted on FM stereophonic sound transmissions.

Reproduced program source material or live studio microphone audio output from the analog switch 108 is applied to the input of an FM stereo encode circuit 134. Left (L) and right (R) sum and difference signals are output from the stereo encode circuit 134 to be supplied as input signals to an FM broadcast transmitter 136 through a combining network 138. The 19 KHz pilot sub-carrier signal is produced within the stereo encode circuit 134 and a sample of the 19 KHz signal is supplied to a frequency tripler 140 to generate a coherent 57 KHz sub-carrier signal which, in turn, is applied to an input of the sub-carrier modulator 132. The 57 KHz sub-carrier signal is, for example, double side-band (DSB) modulated by the information item data present at the output of the interface circuit 130. The modulated 57 KHz sub-carrier is supplied to another input of the combining network 138 to be combined with the broadcast carrier signal generated by the broadcast transmitter 136 and radiated from an antenna installation 142.

Figure 6:
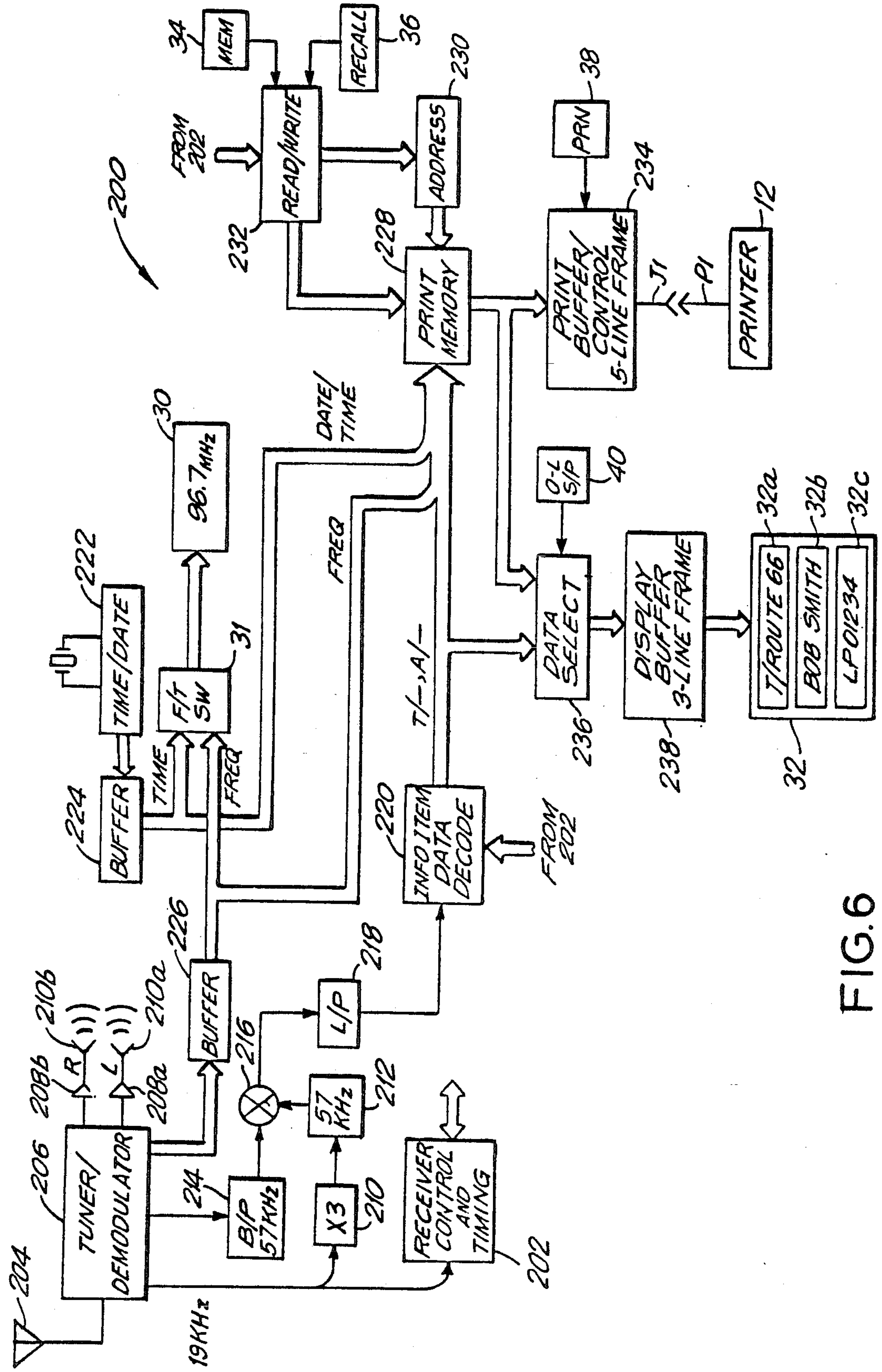
FIG. 6 is a schematic block diagram of the configuration of a receiver according to the invention.

FIG. 6 is a schematic block diagram of an electronic circuit configuration 200 for the receiver 10 or 10' of FIGS. 1 and 2. A receiver control and timing circuit 202 includes one or more CPUs, program and working memories and input/output devices, as are ordinarily required in accordance with standard engineering practice. Circuit 202 controls the operations of various components that comprise the receiver circuit configuration 200.

Signals detected by a receiving antenna 204 are input to a tuner/demodulator unit 206 which can take the form of a conventional FM stereo tuner. Demodulated 1 and R audio signals are supplied to a pair of amplifiers 208*a*, 208*b* for sound reproduction by corresponding speakers 210*a*, 210*b*. A sample of the 19 KHz pilot signal as demodulated by the unit 206, is supplied to control and timing circuit 202 for purposes of synchronization. The 19 KHz pilot signal is also input to a tripler circuit 210 from which a 57 KHz signal is derived by generator 212 in synchronism with the 57 KHz multiplex sub-carrier inserted into the broadcast carrier signal at the station 100. The broadcast DSB modulated 57 KHz sub-carrier is detected and output from the demodulator unit 206 through a bandpass filter 214 to an input of a balanced demodulator circuit 216. The output of demodulator 216 passes through low-pass filter 218 to the input of an information item data decode stage 220. The decode stage 220 converts the DSB modulated information item data into a form suitable for processing, display and printing (e.g., an ASCII format) by the data handling stages of the receiver 10 (or 10'). That is, the data decode stage 220 performs a conversion operation that is inverse to the one performed by the data encode/insert stage 122 at the broadcast station 100.

The output of the data decode stage 220 is suitably buffered by conventional means, and corresponds to the last three lines of the print frames 52, 54, or 56, 58 shown in FIGS. 3 and 4. That is, information data that identifies or pertains to currently broadcast program material, which information may be prefaced by the "T/" or "A/" flag, is output from the data decode stage 220 under the control of receiver control and timing circuit 202.

Receiver 10 (or 10') has an internal calendar circuit 222 which may be, for example, quartz crystal controlled to supply data corresponding to the present date and time in 24-hour format. Output date and time data is buffered at 224 and routed to one input of frequency-time switch circuit 31. Frequency data corresponding to an FM broadcast frequency to which the tuner/-demodulator 206 is presently set, is buffered at 226 and supplied to the other input of the frequency-time switch circuit 31. Depending on the setting of t he switch 31, the LC display panel 30 on the front of the receiver will display either the current time (and date), or the main carrier frequency of a received broadcast station as illustrated in FIG. 6.

The date and time data from the buffer 224, and the frequency data from the buffer 226 are also supplied to an input bus of a print memory 228. Information item data as decoded and output from the decode stage 220 is also supplied to the input bus of the print memory 228, so that data corresponding to the current date, time and station frequency are continuously appended to the decoded information item data obtained from the tuner/demodulator unit 206 of the receiver 10, whenever the information item data is written at selected addresses of the print memory 228.

Address selector circuit 230 is coupled to the print memory 228 and selects sets of, e.g., five memory addresses for storage of each set of information item data. Read/write circuit 232 coupled to the address circuit 230 and the print memory 228 sets the print memory in either a store/write mode in response to operation of memory button 34, or a read/print mode in response to operation of the recall button 36. The output of print memory 228 is supplied to a print buffer/control circuit 234 which is responsive to operation of the print button 38 on the front of the receiver. The buffer/control circuit 234 is adapted to supply, for example, successive five-line frames of text to the printer device 12 through a suitable connector arrangement J1, P1 when the print button 38 is operated. The output of print memory 228 is also routed to one input of display data select circuit 236. The 3-line, decoded information item data from the decode stage 220 is supplied to the other input of data select circuit 236, so as to enable either on-line information item data from the decode stage 220, or previously stored information item data from the output of the print memory 228, to be selected in response to operation of button 40 on the front of the receiver. A display buffer stage 238 arranges the information item data output from the select circuit 236 in suitable form for the three-line text display provided by the receiver LC display panel 32.

Operation of the present broadcasting system proceeds as follows.

A source of musical program material is selected at the radio broadcast station 100 by the announcer or other person in charge. If the program source material has not been previously encoded with information item data as defined herein, such data is entered at the studio by way of the keyboard 116 or other equivalent means and supplied to the data encode/insert stage 122 in FIG. 5. Data select switch 114 is set to receive the encoded information item data, with the "T/" prefix in the case of musical program material (or the "A/" prefix in the case of an advertising message) and the encoded data is written into the data memory 124 under the control of the data memory controller 126. At the time or soon after the selected program material is selected and encoded for stereo transmission at 134, the information item data stored in the data memory 124 is read out through the buffer stage 128 and the interface circuit 130 to modulate the 57 KHz sub-carrier inserted in the broadcast carrier signal by the transmitter 136. In the event the information item data is pre-recorded with the program source material on a digital recording medium such as a CD or a DAT, the data is extracted at 112 and routed by the data select switch 114 to be written in the information item data memory 124 at the appropriate time during reproduction of the program material. A listener receiving the broadcast program from the station 100 with the receiver 10 (or 10'), upon hearing a musical piece or an advertisement of particular interest, operates the memory button 34 so as to enable information item data modulated on the 57 KHz multiplex subcarrier to be decoded at 220 and stored with the current date, time and station frequency at predetermined addresses of the print memory 228. If the display panel 32 on the receiver is set to the on-line mode by the button 40, the listener can view the text of the information item data that he or she is concurrently storing.

When the listener wishes to obtain a printed list of sets of information item data stored during a previous time interval, he or she operates the recall button 36 which enables the read/write circuit 232 to cause, for example, the most recently stored set of information item data in the print memory 228 to be read out to the print buffer/control circuit 234 and the display data select circuit 236. Button 40 may then be operated to allow the read-out data to be selected by the circuit 236 for display on the panel 32 of the receiver, while a printed record is obtained including the date, time and station frequency, by operating print button 38 which enables the buffer/control circuit 234 to output a 5-line frame of text to the printer device 12.

Alternatively, read/write circuit 232 may be programmed to cause the oldest stored set of information item data to be read out first from the print memory 228, proceeding to the most recently stored set of data upon successive operations of the recall button 36.

Because of its information storage capability, the receiver in the present broadcasting system does not pose a safety hazard if installed in a vehicle. In order to note pertinent text transmitted simultaneously with a broadcast program, the driver need only press the memory button 34. A permanent record of the text then can be obtained after the vehicle is safely parked, at the listener's convenience.

The print memory 228 may be in the form of a conventional detachable random access memory (RAM) card capable of being removed from the chassis of the receiver 10 in FIG. 1 after information item data is stored at predetermined addresses of the memory 228. Such a configuration is well-suited to automobile radio installations where it is not especially convenient or economical to provide the separate printer unit 12 with associated power and paper supply. For example, after a driver stores one or more sets of information item data in his or her automobile receiver 10 by operating the memory button 34 during the course of a day, the memory card is detached and withdrawn through a convenient opening or door (not shown) in the receiver cabinet. The memory card is then inserted into a printing and control unit located in the listener's home or other convenient location, at which time the memory contents can be retrieved and printed out in the same fashion as occurs with the printing configuration of FIG. 6. The separate printing and control unit preferably includes a socket connector or equivalent interface for establishing electrical contract with the memory card, memory read/write and address circuits similar to the circuits 230, 232, a print buffer/control circuit similar to the circuit 234, and a printing section to enable paper strips or coupons, like the strips 50, 50' in FIGS. 3 and 4 to be produced. Once all of the memory card contents are retrieved and printed, all memory storage addresses may be cleared by the printing and control unit to place the memory in condition for replacement in an associated socket connector or interface in the receiver 10, and for subsequent storage of new information item data that the user wishes to refer to later on.

In those instances where the encoded text comprises advertising material, a particular advertiser whose name will appear on a printed-out coupon strip 50' in FIG. 4 may wish to offer listeners a certain "bonus" or discount if they present the relevant frames of the coupon strip, showing the date, time and station over which the listener heard the advertisement, and the advertiser's own text. The advertiser will therefore have a means of readily determining the effectiveness of each "coupon" advertisement it places with that station.

It will also be appreciated that the text encoded on the broadcast carrier signal need not correspond just to the title of a musical piece being played or to an advertisement. For example, instructional or educational text may be transmitted for display on the panel 32 simultaneously with audible lessons covering various subjects including music appreciation, wherein technical terms for certain kinds of music passages or beats can be displayed during actual play. Moreover, song lyrics can be encoded for display while a song is being played, and text to enable the listener to "sing along" can also be encoded for display while only background music is broadcast.

Further, the receiver 10 or 10' may also include a tape cassette or CD player as is now customary in most FM radios. For musical pieces that are pre-recorded on cassettes or CD's, it is possible to encode relevant information item data such as a title and artist name in digital form or otherwise, for example, on a subcarrier signal in the recording media. It is therefore contemplated that for such pre-recorded media, the information item data decoding stages shown in FIG. 6 or other suitable decoding stages can be switched or coupled to the output of a tape or CD playback head, to enable a simultaneous display of the information items on the panel 32.

Although the embodiments disclosed herein describe an FM radio broadcasting system, it will be understood that the present invention can be embodied in other systems such as AM, shortwave and television broadcasting.

While the foregoing description represents a preferred embodiment of the present invention, it will be obvious to those skilled in the art that various changes and modifications may be made, without departing from the spirit and scope of the present invention as pointed out by the following claims.

What I claim is:

1. Receiving apparatus for enabling a listener to obtain certain information associated with program material transmitted over a broadcast carrier to which the apparatus is tuned, comprising:

tuner/demodulator means for responding to the broadcast carrier when the tuner/demodulator means is tuned to receive the broadcast carrier;

decoding means associated with said tuner/demodulator means for decoding information item data associated with the broadcast carrier, wherein said information item data is related to the program material transmitted over the broadcast carrier;

print memory means for storing the decoded information item data related to the program material as desired;

address control means coupled to said print memory means for controlling write and read operations for addresses of the print memory means selectively in response to a memory command signal and to a recall command signal;

memory button means coupled to the address control means for producing said memory command signal when said memory button means is operated;

recall button means coupled to said address control means for producing said recall command signal when said recall button means is operated; and print buffer/control means for enabling printing on a printer unit of the decoded information item data stored in said print memory means in response to a print command signal.

2. Receiving apparatus according to claim 1, wherein said print buffer/control means includes means for enabling the information item data to be output to the printer unit in the form of successive frames each having a determined number of print lines.

3. Receiving apparatus according to claim 2, wherein the print lines of a frame relate to identification of a title of the transmitted program material.

4. Receiving apparatus according to claim 2, wherein the print lines of a frame relate to an advertisement.

5. Receiving apparatus according to claim 1, including display means arranged to be coupled to an output of said decoding means for displaying the decoded information item data, said display means including a display panel and means for displaying on said display panel the information item data decoded from the broadcast carrier by said decoding means.

6. Receiving apparatus according to claim 5, including display data select means coupled to said output of said decoding means and to an output of said print memory means for selecting one of a first and a second display mode for the display means, wherein said display data select means comprises;

means for displaying on said display means the information item data when decoded rom the broadcast carrier by said decoding means, when the first display mode is selected, and means for displaying on said display means the decoded information item data stored in said print memory means in response to said recall command signal when the second display mode is selected.

7. Receiving apparatus according to claim 1, including;

means for locally generating supplemental information data for supplementing the decoded information item data; and means coupled to an output of said locally generating means and to an output of said decoding means for providing both of the locally generated supplemental information data and the decoded information item data to a data input of said print memory means.

8. Receiving apparatus according to claim 7, wherein said locally generating means includes means for generating frequency data corresponding to a station frequency to which the apparatus is tuned.

9. Receiving apparatus according to claim 7, wherein said locally generating means includes means for generating time data corresponding to a current time of day.

10. Receiving apparatus according to claim 7, wherein said locally generating means includes means for generating date data corresponding to a current date.

11. Receiving apparatus according to claim 1, wherein said print memory comprises a detachable memory card.

12. A system for receiving broadcast program material, wherein certain information associated with the program material can be stored for later retrieval, comprising:

a receiver including;

tuner/demodulator means for responding to a broadcast carrier when the tuner/demodulator means is tuned to received the broadcast carrier, decoding means associated with said tuner/demodulator means for decoding information item data associated with the broadcast carrier, wherein said information item data is related to program material transmitted over the broadcast carrier, detachable print memory means for storing the decoded information item data related to the program material, as desired, and first connector means for accepting said print memory means and for coupling the print memory means to said decoding means; and a printer and control unit including;

second connector means for accepting said detachable print memory means, address control means coupled to said second connector means for controlling addressing of the print memory means when inserted in said second connector means, a printer, and print/buffer control means for enabling printing by said printer of the decoded information item data stored in said print memory means in response to a print command signal.

13. The system of claim 12, wherein said print memory means is in the form of a detachable memory card.

14. The system of claim 12, wherein the address control means of said printer and control unit includes means for clearing memory storage addresses of said print memory means when inserted in said second connector means, for enabling subsequent storage of new information item data when the print memory means is inserted in the first connector means of said receiver.

15. The system of claim 12, wherein said printer/-buffer control means includes means for enabling the information item data to be output to the printer in the form of successive frames each having a determined number of print lines.

16. The system of claim 15, wherein the print lines of a frame relate to identification of a title of the transmitted program material.

17. The system of claim 15, wherein the print lines of a frame relate to an advertisement.

18. Receiving apparatus according to claim 1, comprising display means arranged to be coupled to an output of said decoding means for displaying the decoded information item data;

playback means for reproducing program material and encoded information item data recorded on a recording media, and for producing a corresponding output signal; and means for coupling the output signal from said playback means to an input of said decoding means so that the information item data encoded on said recording media can be decoded for display on said display means.

19. Receiving apparatus according to claim 18, including print memory means arranged to be coupled to said decoding means for storing the decoded information item data as desired.

20. Receiving apparatus according to claim 19, wherein said print memory means comprises a detachable memory card.

* * * * *